United States Patent [19]

Griffey

[11] Patent Number: 4,998,031
[45] Date of Patent: Mar. 5, 1991

[54] STEPPING MOTOR WITH ONE-WAY CLUTCH

[76] Inventor: Henry L. Griffey, P.O. Box 463, Loyall, Ky. 40854

[21] Appl. No.: 299,082

[22] Filed: Jan. 23, 1989

[51] Int. Cl.$^5$ .............. H02K 7/06; H02K 33/02; H02K 33/04; H02K 7/10
[52] U.S. Cl. ..................... 310/37; 310/36; 310/49 R; 310/80
[58] Field of Search .......... 310/23, 30, 34, 36, 310/37, 38, 39, 49 R, 80, 83; 335/177, 182, 183, 184

[56] References Cited

U.S. PATENT DOCUMENTS

| 1,725,203 | 8/1929 | McNerney | 310/37 |
|---|---|---|---|
| 1,782,242 | 11/1930 | McNerney | 310/37 |
| 1,851,543 | 3/1932 | Bossard | 310/38 |
| 2,364,656 | 12/1944 | Price | 310/36 |
| 2,449,901 | 9/1948 | Kaiser | 310/36 |
| 2,845,920 | 8/1958 | Bruce | 310/23 |
| 3,001,092 | 9/1961 | Nemeth | 310/37 |
| 3,097,278 | 7/1963 | Alderman | 310/49 R |
| 3,097,316 | 7/1963 | Barden et al. | 310/49 R |
| 3,139,546 | 6/1964 | Parr | 310/39 |
| 3,302,045 | 1/1967 | Dotto | 310/37 |
| 3,517,236 | 6/1970 | Touchman | 310/49 R |
| 3,599,022 | 8/1971 | Adair | 310/75 A |
| 3,693,124 | 9/1972 | Ganowsky | 310/37 |
| 4,164,722 | 8/1979 | Garvey | 310/36 |
| 4,187,452 | 2/1980 | Knappe et al. | 310/36 |

FOREIGN PATENT DOCUMENTS 769872 3/1957 United Kingdom ............ 310/49 R

Primary Examiner—Steven L. Stephan
Assistant Examiner—C. LaBalle
Attorney, Agent, or Firm—King & Schickli

[57] ABSTRACT

A high torque AC stepping motor is provided. The motor includes a stator with six radially spaced coils. Spaced radially extending arms on an armature core are positioned adjacent the coils. The armature is mounted by a torsional shaft assembly including two concentric torque tubes. the torsional action of the tubes serves to return the armature to a home position after each current pulse. A one way sprag clutch is driven by the output shaft connected to the armature to turn an output gear or the like. A timer controls the AC power source to provide the precise rotary output. A system for precisely feeding webs of material for processing utilizing the stepping motor is also disclosed.

2 Claims, 2 Drawing Sheets

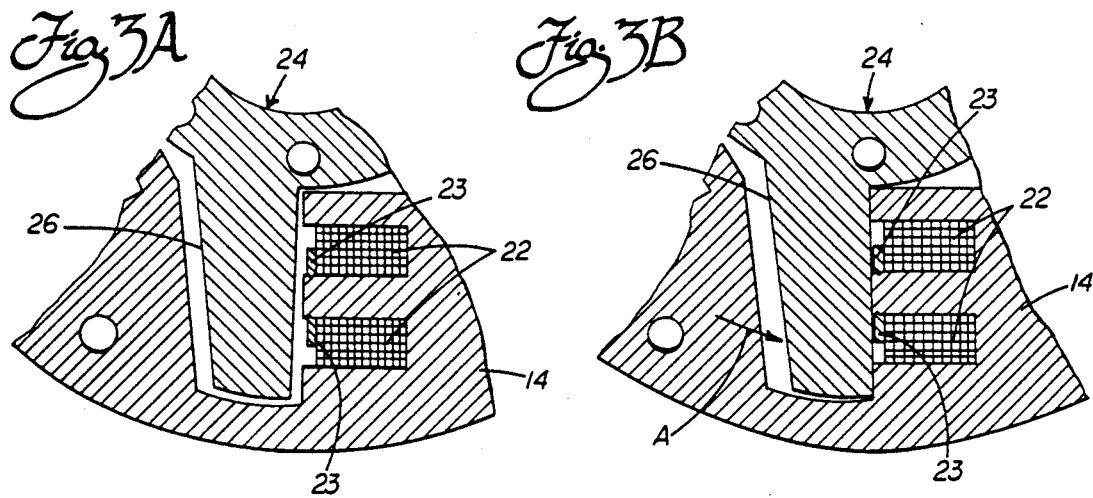
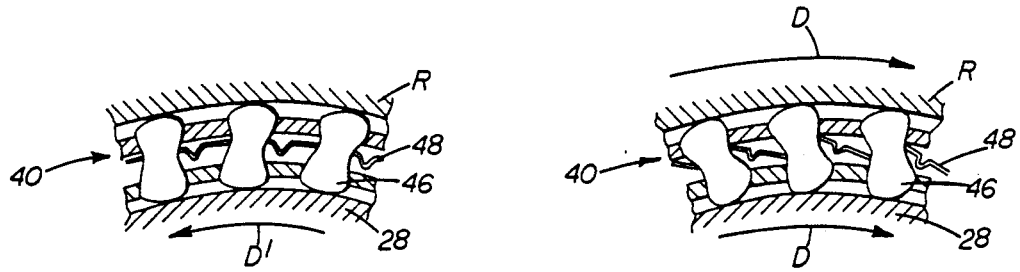
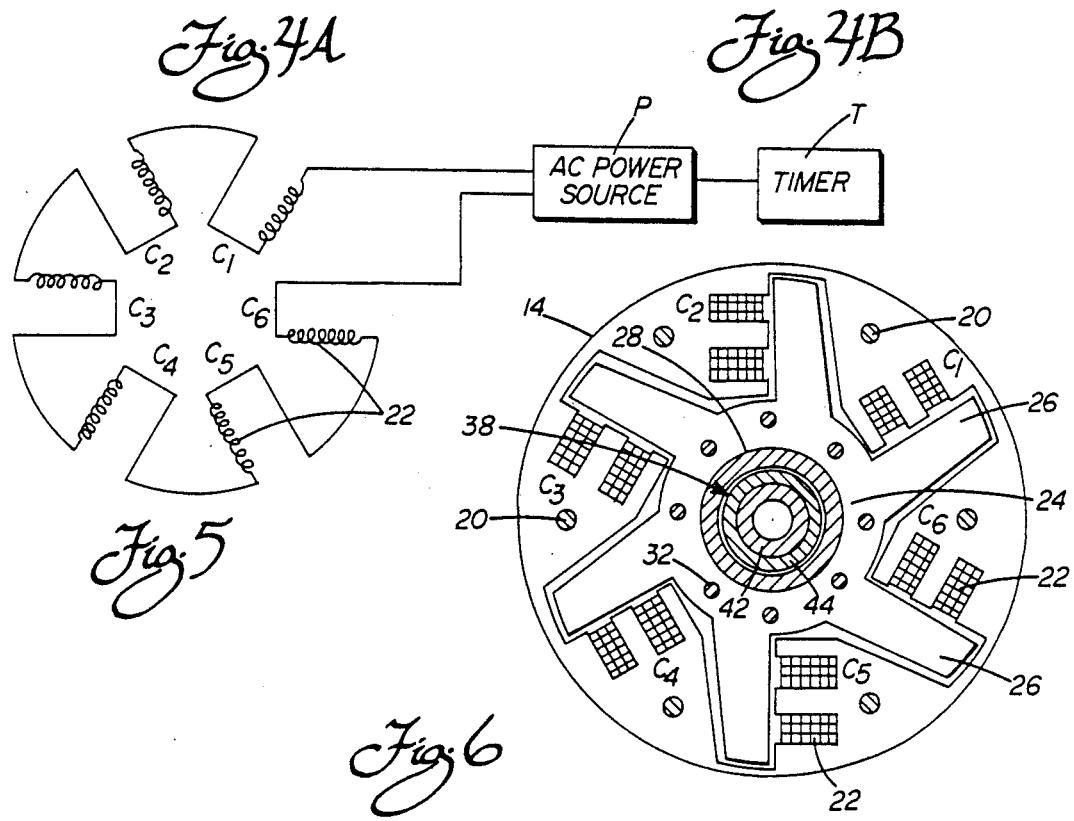

STEPPING MOTOR WITH ONE-WAY CLUTCH

TECHNICAL FIELD

The present invention relates generally to electric motors, and more particularly, to an alternating current stepping motor exhibiting the desirable qualities of high torque and precise incremental output, and a direct drive system for feeding a web.

BACKGROUND OF THE INVENTION

A wide variety of electric motors are currently available in the marketplace today. The choice of the correct motor to use for a given application frequently depends on technical system requirements, such as voltage, torque output, speed and reversability. Of course, the cost and serviceability of the motor also plays a large part in the final selection.

In processes such as feeding webs of metal for stamping, a high torque, precise feeding motor is desirable. Generally, synchronous motors are not well suited to such an application because a clutch and complicated gear train are necessary to reduce the relatively low torque, high motor speed output to the desired high torque/low RPM output.

For these applications, stepping motors providing relatively high torque coupled with a precise output show substantial promise of success. However, the motors developed today necessarily must include an electronic controller or microprocessor and feedback loops, which contributes to greater cost and increased motor/system complexity.

A need exists therefore, for an improved stepping motor providing a high torque precision incremental output without the use of an expensive motor controller or the like. Such a motor would exhibit the desirable, high torque, stepped output characteristics yet exhibit improved operational characteristics, such as improved reliability and serviceability, while also being relatively economical to manufacture.

SUMMARY OF THE INVENTION

It is therefore a primary object of the present invention to provide a stepping motor and related web drive system to overcome the limitations and disadvantages of the prior art.

Another object of the present invention is to provide a stepping motor providing a high torque, precise incremental output.

Yet another object of the present invention is to provide a stepping motor utilizing a one-way clutch to provide the desirable pulsed or incremental output.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a stepping motor including a heavy duty one-way clutch is provided to produce a precise incremental, high torque rotary output. The stepping motor disclosed can be used in metal stamping press applications, for example, where the high torque precise rotary output is desirable.

The stepping motor of the present invention includes an annular stator core. The stator is fabricated of stacked plates and includes a set of six coils which are equally spaced and radially arranged about the center of the stator.

An armature is located centrally in an open area within the stator. The armature includes six outwardly extending arms positioned adjacent the coils. As will be described in more detail below, electrical energization of the coils produces a magnetic force to attract the armature in a first rotary direction. The resultant rotational motion of the armature is transmitted to an output gear, pulley or the like by a sleeve-like output shaft.

According to an important aspect of this invention, a torsional shaft assembly is provided to also act upon the output shaft. In the preferred embodiment, the torsional shaft assembly includes two concentric torque tubes mounted within the output shaft. The torque tubes produce a torque force to bias the armature in a second direction away from the coils. Thus, upon the deenergization of the coils, the armature is returned to the "home" position.

During operation, the magnetic force generated by the coils cycles due to the periodic nature of alternating current. As the magnetic force increases beyond the force exerted by the torsional shaft assembly, the armature is drawn in the forward or first direction towards the coils.

The one-way clutch transmits the rotation in the first direction to the output gear. When the coils are deenergized, the motion of the armature is reversed.

To explain, when the magnetic force is terminated, the spring force exerted by the torsional shaft assembly urges the armature in the reverse or second direction. Due to the one way nature of the clutch, this motion in the second direction is not transmitted to the output gear. Instead, the armature returns to the "home" position in readiness for the next coil energization cycle.

The above cycle is repeated 120 times per second. Thus, the motor output pulses at 120 pulses per second producing the desired incremental or stepped output. In this way, the desirable high torque pulsed rotary output is obtained without the need for complicated and expensive electronic motor controllers. At this speed with the small steps, or increments, the drive motion is relatively smooth and is capable of efficient, precise driving action.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 3A is a partial cutaway view showing the relationship of an armature arm and the stator when the armature is in the home position;

FIG. 3B is a partial cutaway view showing the movement of the armature arm upon energization of the coils in the stator;

FIG. 4A is a partial cutaway view of the sprag type clutch utilized in the stepping motor of the present invention, the clutch being shown in the free wheeling position;

FIG. 4B is a partial cutaway view of the sprag type clutch utilized in the present invention shown in the engaged position;

FIG. 5 is a schematic representation of the coil electrical circuit;

FIG. 6 is a reduced cross sectional view taken along sectional lines 6—6 of FIG. 2.

Reference will now be made in detail to the present preferred embodiment of the invention, an example of which is illustrated in the accompanying drawing.

DETAILED DESCRIPTION OF THE INVENTION

Figure 1:
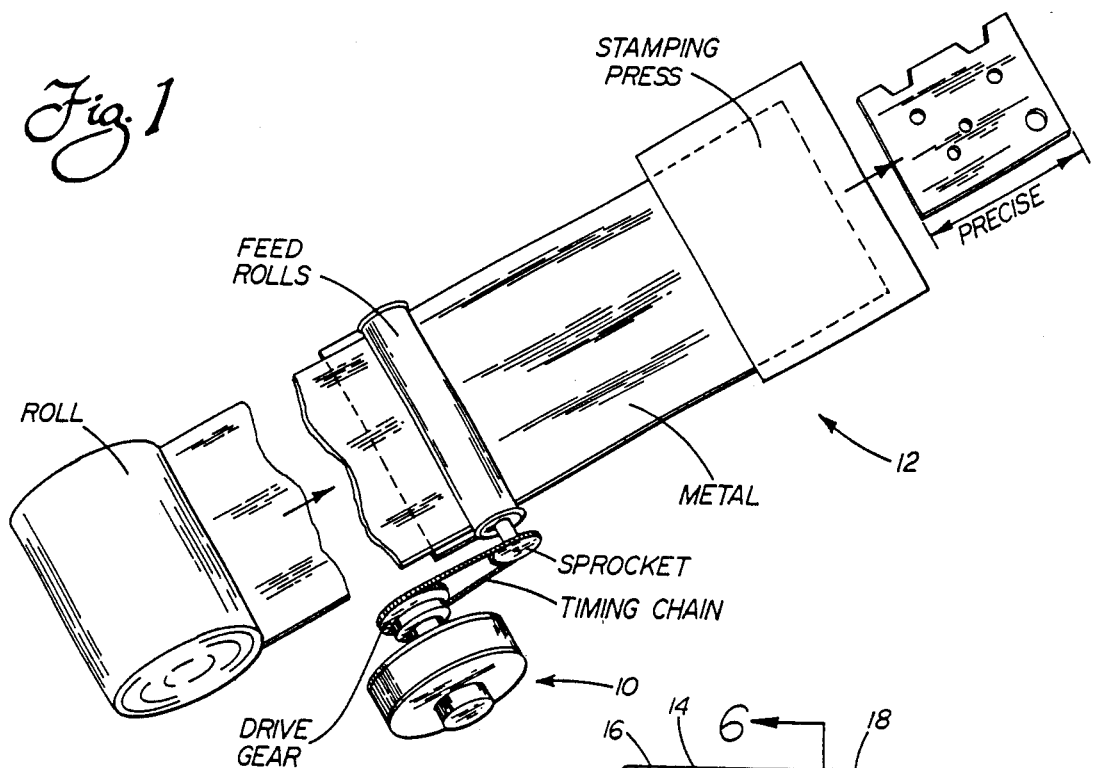
FIG. 1 is a perspective view of a precision stamping apparatus utilizing the stepping motor of the present invention.

Reference is made to FIG. 1 showing the stepping motor 10 of the present invention utilized in a precision stamping apparatus 12. Advantageously, the stepping motor 10 provides a precise, high torque output ideal for driving feed rolls for webs of metal or the like. The precision incremental output of the stepping motor 10 is obtained without the use of complicated (and expensive) motor controllers. Thus, the stepping motor 10 of the present invention provides improved efficiency at a reduced cost.

Due to the precision output, the stepping motor 10 can be instantaneously started and stopped. This has an advantage in the stamping press application, as well as many other applications where the instantaneous stopping coupled with the availability of maximum torque upon starting, is desirable for precise feeding of heavy materials. This also reduces the complexity of the associated control systems because the precise operation of the stepping motor negates the necessity for complicated sensors and control mechanisms to accomodate the less accurate operation of the other available motors. All that is required is a simple timer to operate the motor through a specific number of pulses for the feed distance specified. As shown, the means for connecting the motor and drive rolls is direct comprising simply a timing chain, and drive sprockets, thus avoiding the necessity of clutches, complicated gear trains and the like, as required for synchronous motor drives, for example. As shown, the difference in size of the sprockets can effect a speed reduction/enhancement, as may be desired.

Figure 2:
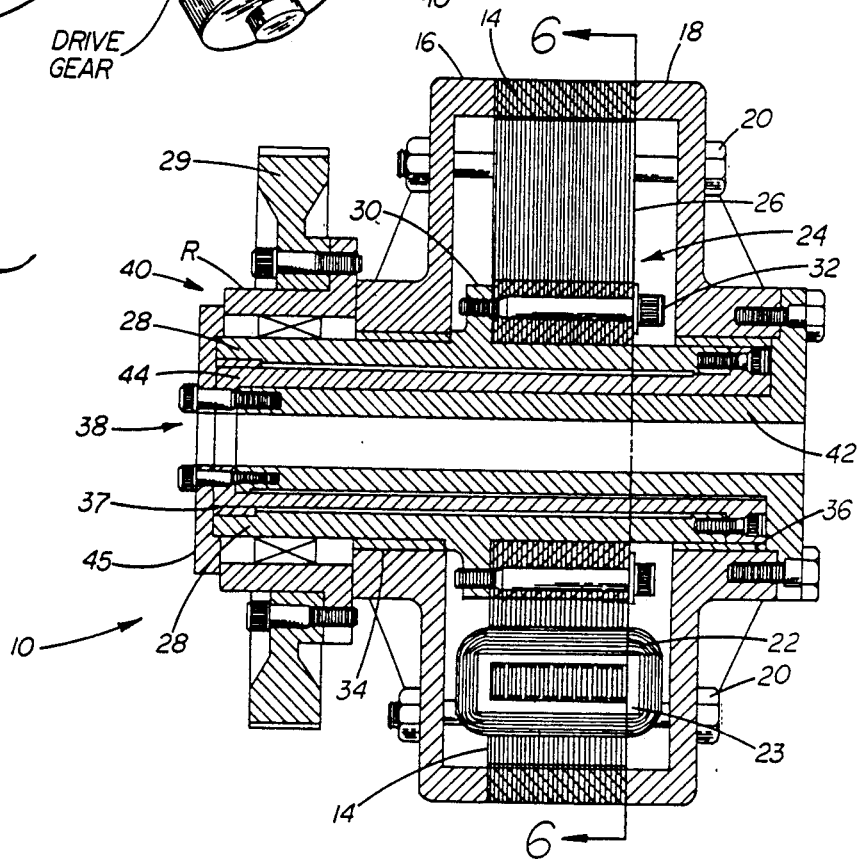
FIG. 2 is a cross sectional view of the stepping motor of the present invention.

As shown in FIGS. 2 and 6, the stepping motor 10 includes a stator core 14. As is known in the art, the stator core 14 is comprised of a plurality of stacked iron or similar ferromagnetic plates. Each plate is identical such that when stacked, the plates form a solid metallic body. As shown in FIG. 2, the stacked plates comprising the stator core 14 are securely held together within the two housing halves 16, 18 by through bolts 20.

As shown in FIG. 6, the stator core 14 includes six radially arranged electromagnetic coils 22. As is known in the art, the coils are preferrably comprised of a plurality of turns of suitable copper wire. A coil retainer clip 23, as shown in FIG. 2, may be provided to retain the coil windings in position within the stator core 14.

As shown in FIG. 5, the six coils $C_1$–$C_6$ are connected in series to an AC power source P. When energized by a suitable timer T, and as will be described in more detail below, the coils 22 produce electromagnetic pulses. These pulses are then utilized to operate the motor.

As shown in FIGS. 2 and 6, the stepping motor 10 further includes a concentric armature 24. As shown in FIG. 6, the armature 24 is received within the center, open area of the stator core 14. The armature 24 includes six outwardly projecting arms 26. As shown, the arms 26 extend adjacent the coils 22. As is further shown, one arm 26 is provided for each coil 22.

As with the stator core 14, the armature 24 is comprised of a plurality of stacked ferrous plates. Thus, upon energization of the coils 22 the arms 26 of the armature 24 are drawn toward the coils 22 by the magnetic force generated, imparting a rotary motion to the armature 24. In the preferred embodiment, the outer section of the arms 26 travel approximately 0.080" (see action arrow A in FIG. 3B). Accordingly, each pulse of the motor 10 produces an output having the same 0.080" advancement, as will be seen more in detail below.

According to an important aspect of this invention, the stepping motor 10 takes advantage of the cyclical or sinusoidal nature of alternating current. More specifically, and as is well known in the art, AC alternates between maximum and minimum values periodically. Thus, it follows that the magnitude of the electromagnetic force F generated by the coils 22 also cycles periodically. In this application, the magnitude of the force F is represented by the equation $$F = kI^2 \sin^2 \omega t$$

where k is a constant, I is current and $\omega$ is the supply frequency. The motor 10 goes through 120 operative pulsations per second when the current is rectified and the supply frequency is 60 Hertz (as found in the United States).

The rotary motion of the armature 24 is transmitted by a hollow output shaft 28 to an output drive gear 29, as shown in FIG. 2. The drive gear 29 is about the same diameter as the outer section of the arms of the armature 24 (see FIG. 2) and thus travels about the same distance. The output shaft 28 includes an annular shoulder 30 and bolts 32 for retaining the armature 24.

In order to assure smooth, substantially friction free motion of the output shaft 28, the housing halves 16, 18 respectively include annular bearings or bushings 34 and 36 to support the shaft 28. Further, the inside of the shaft 28 supports an annular bearing 37 at the output end. In the preferred embodiment, these bearings are fabricated from bronze to provide the desired low friction interface.

According to an important aspect of the present invention, the output shaft 28 is mounted upon a torsional shaft assembly 38. Advantageously, the torsional shaft assembly 38 working in conjunction with a one way output clutch 40 assures the desired one way rotary output of the stepping motor 10 of the present invention.

More specifically, the torsional shaft assembly 38 includes two concentric torque tubes 42 and 44. An end cap 45 is provided to maintain the relation of the output shaft 28, the output gear 29 and the torque tubes 42, 44. Together, the torque tubes 42 and 44 produce a torque or spring force tending to urge the armature 24 in a second direction (reverse or away from the coils 22). When the power source P is energized, and the electromagnetic force F generated by the coils 22 exceeds the force exerted by the torsional shaft assembly 38, the armature 24 is pulled in the first direction towards the coils. Conversely, when the electromagnetic force is less, the biasing force of the torsional shaft assembly 38 returns the armature 24 in the second direction or to its home position.

The clutch 40 comprises a plurality of internal sprags 46 and an annular ribbon spring 48. The action of the sprags 46 and the spring 48 provide the desired one way output. As shown in FIG. 4B, the rotational motion of the output shaft 28 in the first direction D is transmitted by the sprags 46 causing the outer race R of the clutch 40 to rotate in the same direction. This imparts the rotary motion to the output gear 29. Conversely, in FIG. 4A, when the output shaft 28 rotates in the second direction D, the sprags 46 do not engage the outer race R and therefore no rotational output motion is transmitted by the clutch 40. The ribbon spring 48 is provided to assure uniform motion of the sprags 46. This, of course assures even loading.

An example of a sprag type clutch which has been used with success is the Double-Cage Sprag Clutch manufactured by Borg Warner.

The high torque, low RPM capabilities of the motor 10 have been borne out by experimentation. More specifically, the motor 10 produces 30 horsepower at 30 RPM. Advantageously, this power output is generated substantially instantaneously upon starting of the motor 10. The precise incremental operation with instantaneous start/stop action that is needed for web feeding operations (FIG. 1) or the like is now possible.

In summary, numerous benefits have been described which result from employing the concepts of the present invention. In particular, the stepping motor 10 produces a high torque, incremental rotary output from an alternating current input without the need for an external electronic motor controller. A one way clutch 40 along with the torsional shaft assembly 38 assures the one-way rotary output. In this way, the desirable stepped output is provided.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. An alternating current stepping motor for high torque output operation, comprising:
   a housing;
   a stator core supported by said housing including a plurality of radially spaced electro-magnetic coils connected in series to an alternating current power source so as to provide simultaneous energization to substantially all of said coils;
   an armature supported within said housing for rotation only in a first direction upon energization of said coils, said rotation providing for positive motor drive only in said first direction;
   biasing means for urging said armature in a second direction away from said coils;
   an output shaft connected to said armature;
   said biasing means comprising a torsional spring concentrically mounted and attached between said housing and said output shaft, said torsional spring including two concentric tubes; and
   one-way clutch means connected to said output shaft;
   whereby upon energization of said coils, said armature is rotated in the first direction and upon deenergization of said coils, said armature is moved in the second direction by said biasing means, thus producing a pulsed output.

2. The stepping motor of claim 1 wherein said output shaft is a sleeve and said concentric tubes are mounted within said sleeve.

* * * * *